United States Patent
Brüggemann et al.

(10) Patent No.: US 10,352,732 B2
(45) Date of Patent: Jul. 16, 2019

(54) SIGNAL PROCESSING DEVICE FOR PROCESSING A MEASUREMENT SIGNAL IN A MOTOR VEHICLE

(71) Applicant: Continental Teves AG & Co. oHG, Frankfurt (DE)

(72) Inventors: Stephan Brüggemann, Frankfurt am Main (DE); Jörg Eckrich, Wiesbaden (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 49 days.

(21) Appl. No.: 15/508,574

(22) PCT Filed: Sep. 22, 2015

(86) PCT No.: PCT/EP2015/071704
§ 371 (c)(1),
(2) Date: Mar. 3, 2017

(87) PCT Pub. No.: WO2016/046194
PCT Pub. Date: Mar. 31, 2016

(65) Prior Publication Data
US 2017/0276521 A1    Sep. 28, 2017

(30) Foreign Application Priority Data
Sep. 22, 2014  (DE) .......................... 10 2014 219 004

(51) Int. Cl.
*G01D 5/244*     (2006.01)
*B60G 17/019*    (2006.01)
(Continued)

(52) U.S. Cl.
CPC ... *G01D 5/24476* (2013.01); *B60G 17/01908* (2013.01); *G01D 5/24471* (2013.01);
(Continued)

(58) Field of Classification Search
CPC .. G01D 5/244; G01D 5/24476; G01P 15/165; G01P 15/16; B60G 17/01908;
(Continued)

(56) References Cited

U.S. PATENT DOCUMENTS 5,015,934 A    5/1991  Holley et al.
6,633,827 B2  10/2003  Dietmayer
(Continued)

FOREIGN PATENT DOCUMENTS

CN   101196532 A    6/2008
CN   201348929 Y   11/2009
(Continued)

OTHER PUBLICATIONS

Nguyen et al., A Hybrid TDMA Protocol Based Ultra-Wide Band for In-car Wireless Communication, 2009 IEEE, 7 pp.*
(Continued)

*Primary Examiner* — Toan M Le
(74) *Attorney, Agent, or Firm* — RatnerPrestia

(57) ABSTRACT

A signal processing device for processing a measurement signal in a motor vehicle, wherein the measurement signal relates to a measurement variable which can change over time with sequential measurement values, including: a first signal processing unit for calculating the measurement variable which can change over time from the measurement signal; a second signal processing unit for processing the measurement variable which can change over time in order to obtain a processed measurement variable; a third signal processing unit for calculating a change rate of the measurement variable which can change over time, the third signal processing unit being designed to output an additional measurement signal which indicates the change rate; and a communication interface which is designed to combine the processed measurement variable and the additional mea-
(Continued)

surement signal into a composite transmission signal and to transmit the composite transmission signal.

19 Claims, 3 Drawing Sheets

(51) Int. Cl.
*G01P 15/16* (2013.01)
*B60Q 1/115* (2006.01)

(52) U.S. Cl.
CPC ........ *G01P 15/165* (2013.01); *B60G 2400/10* (2013.01); *B60Q 1/115* (2013.01)

(58) Field of Classification Search
CPC .......... B60G 17/01933; B60G 17/0195; B60G 2400/10; B60G 2400/20; B60Q 1/115; B60Q 1/12
See application file for complete search history.

(56) References Cited

U.S. PATENT DOCUMENTS

| | | | |
|---|---|---|---|
| 7,162,333 B2 | 1/2007 | Koibuchi et al. |
| 7,668,689 B2 | 2/2010 | Aono |
| 8,179,126 B2 | 5/2012 | Li et al. |
| 8,315,575 B2 | 11/2012 | Puma et al. |
| 2009/0048736 A1 | 2/2009 | Kristensen et al. |
| 2012/0158335 A1 | 6/2012 | Donovan et al. |
| 2012/0210791 A1* | 8/2012 | Pannek | B62D 6/10 73/514.02 |
| 2012/0269253 A1* | 10/2012 | Daecke | H04B 3/14 375/232 |
| 2014/0214970 A1 | 7/2014 | Rasbornig et al. |

FOREIGN PATENT DOCUMENTS

| | | |
|---|---|---|
| CN | 102203545 B | 12/2014 |
| DE | 69503291 T2 | 3/1999 |
| DE | 60211380 T2 | 2/2007 |
| DE | 102007042979 A1 | 4/2009 |
| DE | 102012216155 A1 | 3/2014 |
| JP | 2002005690 A | 1/2002 |
| KR | 20140095975 A | 8/2014 |

OTHER PUBLICATIONS

Kurian et al., A Realization of an FPGA Sub System for Reducing Odometric Localization Errors in Wheeled Mobile Robots, 2009, Journal of Automation, Mobile Robotics & Intelligent Systems, vol. 3, No. 3, pp. 26-33 (Year: 2009).*
Korean Office Action for Korean Application No. 10-2017-7007026, dated Apr. 20, 2018, including English translation, 15 pages.
German Search Report for German Application No. 10 2014 219 004.5, dated Mar. 30, 2015, including partial English translation, 7 pages.
International Search Report and Written Opinion for International Application No. PCT/EP2015/071704, dated Dec. 3, 2015, 9 pages.
Chinese Office Action with Search Report for Chinese Application No. 201580047405.3, dated Nov. 30, 2018, 9 pages.

* cited by examiner

SIGNAL PROCESSING DEVICE FOR PROCESSING A MEASUREMENT SIGNAL IN A MOTOR VEHICLE

CROSS REFERENCE TO RELATED APPLICATIONS

This application is the U.S. National Phase Application of PCT International Application PCT/EP2015/071704, filed Sep. 22, 2015, which claims priority to German Patent Application No. 10 2014 219 004.5, filed Sep. 22, 2014, the contents of such applications being incorporated by reference herein.

FIELD OF THE INVENTION

The present invention relates to a signal processing apparatus for processing a measurement signal in a motor vehicle.

BACKGROUND OF THE INVENTION

A motor vehicle with active suspension control frequently has a chassis position sensor that captures a sensor value for the chassis position. By way of example, the sensor value indicates an angle of the wheel of the motor vehicle with respect to a chassis of the motor vehicle. The chassis position sensor can comprise a signal output for outputting a captured sensor value in the form of an analog voltage signal. Further, the signal output may be connected via a signal line to an electronic controller, such as an electronic control unit (ECU), that is designed to extract a sensor value from the analog voltage signal and to process the extracted sensor value further.

In this context, the electronic controller frequently comprises an analog-to-digital converter for converting the analog voltage signal into a digital signal, from which the sensor value is extracted. On account of the analog-to-digital conversion, for example as a result of quantization errors, on account of possible disturbances in the transmission of the analog voltage signal via the signal line, for example as a result of electromagnetic interfering radiation, or on account of delays in filters, an accuracy of the sensor value extracted in the electronic controller may be lower than a capture accuracy of the measurement sensor.

SUMMARY OF THE INVENTION

An aspect of the invention specifies a more efficient design for a signal processing apparatus for processing a measurement signal in a motor vehicle.

According to one aspect of the invention, provided is a signal processing apparatus for processing a measurement signal in a motor vehicle, wherein the measurement signal relates to a time-variant measured variable having successive measured values, having: a first signal processing device for computing the time-variant measured variable from the measurement signal;

a second signal processing device for processing the time-variant measured variable in order to obtain a processed measured variable; a third signal processing device for computing a rate of change of the time-variant measured variable, wherein the third signal processing device is designed to output a supplementary measurement signal that indicates the rate of change; and a communication interface that is designed to combine the processed measured variable and the supplementary measurement signal to form a compiled transmission signal and to transmit the compiled transmission signal. This achieves the advantage that the measurement signal can be processed efficiently.

The motor vehicle may be a motor car, a truck, an automobile or a motor cycle. Further, the motor vehicle can have a measurement sensor that is used to provide the measurement signal. By way of example, the motor vehicle is produced with active suspension control, level control and/or automatic headlamp range adjustment, and the measurement sensor is a chassis position sensor, such as a height position sensor. In this context, a housing of the chassis position sensor may be connected to a chassis of the motor vehicle. Further, a wheel suspension or a wheel of the motor vehicle may be connected via a rod assembly to a lever of the chassis position sensor. This allows the chassis position sensor to be used to detect a movement and/or an angle of the wheel of the motor vehicle relative to the chassis of the motor vehicle. By way of example, the time-variant measured variable is the angle of the wheel of the motor vehicle relative to the chassis of the motor vehicle, and the measurement signal is an angle signal. The measurement signal may further be an analog signal or a digital signal.

The first signal processing device can comprise a processor for performing a coordinate rotation digital computer (CORDIC) algorithm, such as a CORDIC block, or may be formed by a processor for performing a coordinate rotation digital computer (CORDIC) algorithm, such as a CORDIC block.

The second signal processing device can comprise a post-processing device. Further, the second signal processing device may be designed to filter the measurement signal, for example by means of a lowpass filter or a bandpass filter.

The third signal processing device can comprise a processor for computing the rate of change. By way of example, the time-variant measured variable is the angle of the wheel of the motor vehicle relative to the chassis of the motor vehicle, and the measurement signal is the angle signal. In this context, the rate of change may be a speed, particularly an angular speed or a wheel assembly speed, and/or an acceleration, particularly a wheel assembly acceleration, of the wheel of the motor vehicle. Further, the third signal processing device may be designed to perform a computation of the speed by computing a 1st derivation of the computed time-variant measured variable and/or a computation of the acceleration by computing a 2nd derivation of the computed time-variant measured variable in accordance with the formulae $$V = \Delta a/\Delta t; \text{ and}$$

$$a = \Delta v/\Delta t;$$

where $\Delta a$ denotes a difference between two computed measured variables, $\Delta t$ denotes a time difference, v denotes the speed, a denotes the acceleration and $\Delta v$ denotes a difference between two computed speeds. By way of example, the time difference $\Delta t$ corresponds to a period of time between two samples, which is known in the case of synchronous sampling. Further, the third signal processing device may be designed to compute a function derived from the computed time-variant measured variable.

The communication interface can comprise a wired communication interface and/or a wireless communication interface for communication via a communication network. By way of example, the communication interface comprises a serial interface, an interface based on the Peripheral Sensor Interface 5 (PSI5) standard, an interface based on the Single Edge Nibble Transmission (SENT) standard, an interface based on the Power Management Bus (PMBus) standard, an interface based on the Universal Serial Bus (USB) standard, an interface for wireless communication by means of radio frequency identification (RFID), for example based on the ISO/IEC 14443 or ISO/IEC 18000-3 standard, an interface for wireless communication by means of Near Field Communication (NFC), for example based on the ISO/IEC 14443 or ISO/IEC 18092 standard, or an interface for wireless communication based on one of the Bluetooth, ZigBee or Wireless Local Area Network (W-LAN) standards. Further, the communication interface may be a digital interface. The communication network may be a telephone network, a mobile radio network, a computer network, for example a local area network (LAN) or a wireless local area network (W-LAN), or the Internet.

Further, the communication interface may be designed for transmitting the compiled transmission signal to an electronic controller, such as an electronic control unit (ECU), of the motor vehicle, in which the received compiled transmission signal, which can comprise an angle signal, can be processed further. By way of example, the electronic controller is an engine control unit.

According to one embodiment, the signal processing apparatus may be integrated in a sensor, particularly in a measurement sensor.

In one advantageous embodiment, the measured values are chassis position values of a chassis of the motor vehicle or angle measured values, which refer to the chassis position of the chassis of the motor vehicle, or temperature measured values. This achieves the advantage that the measured values can be captured efficiently.

In a further advantageous embodiment, the time-variant measured variable comprises successive angle measured values as measured values, wherein the measurement signal comprises sine values and cosine values as a function of the angle measured values, and wherein the first signal processing device is designed to compute the angle measured values from the sine values and the cosine values. This achieves the advantage that the time-variant measured variable can be computed efficiently.

In a further advantageous embodiment, the first signal processing device is designed to implement the CORDIC algorithm for computing the time-variant measured variable from the measurement signal. This achieves the advantage that a particularly inexpensive and efficient first signal processing device can be used.

In a further advantageous embodiment, the second signal processing device has a signal processing delay, and the second signal processing device is designed to delay the measurement signal by the signal processing delay in order to obtain the processed measured variable. This achieves the advantage that the compiled transmission signal can be synchronized with a further transmission signal particularly efficiently.

In a further advantageous embodiment, the second signal processing device is designed to reduce a maximum value of the measurement signal or to use clamping to process it or to filter it, particularly by means of low-pass filtering or bandpass filtering, or to process the measurement signal by means of mean value formation, particularly by forming an arithmetic mean value from two or more measured values, in order to obtain the processed measured variable. This achieves the advantage that the processed measured variable can be determined efficiently.

In a further advantageous embodiment, the third signal processing device is designed to compute the rate of change of the time-variant measured variable by means of a derivation of the variant measured variable with respect to time, particularly by forming a difference between successive measured values, in order to obtain a speed value as supplementary measurement signal. This achieves the advantage that a speed sensor for capturing the speed value can be dispensed with.

In a further advantageous embodiment, the third signal processing device is designed to compute the rate of change of the time-variant measured variable by means of a second derivation of the variant measured variable with respect to time, in order to obtain an acceleration value as supplementary measurement signal. This achieves the advantage that an acceleration sensor for capturing the acceleration value can be dispensed with.

In a further advantageous embodiment, the measurement signal comes from a measurement sensor, and the communication interface is further designed to combine the processed measured variable, the supplementary measurement signal and measurement sensor parameters, particularly temperature values, offset values or gain values, to form the compiled transmission signal and to transmit the compiled transmission signal. This achieves the advantage that the measurement sensor can be monitored efficiently.

The measurement sensor parameter can be evaluated by an external observer, such as the electronic controller. By way of example, the external observer is designed to identify an unstable operating state or failure of the measurement sensor at an early stage.

In a further advantageous embodiment, the communication interface is a PSI5 or SENT communication interface or the communication interface forms a digital interface based on the PSI5 or SENT standard. This achieves the advantage that an efficient communication interface can be used.

In a further advantageous embodiment, the communication interface is designed to combine the processed measured variable and the supplementary measurement signal to form a compiled transmission signal on the basis of the PSI5 or SENT protocol in order to obtain the compiled transmission signal. This achieves the advantage that the compiled transmission signal can be determined efficiently.

In a further advantageous embodiment, the compiled transmission signal is a digital signal, and the communication interface is designed to subject the compiled transmission signal to digital-to-analog conversion. This achieves the advantage that the compiled transmission signal can be transmitted efficiently.

In a further advantageous embodiment, the communication interface is designed to transmit the compiled transmission signal by means of TDMA. This achieves the advantage that a transmission channel used for transmitting the compiled transmission signal can be used efficiently by using time division multiple access (TDMA).

In a further advantageous embodiment, the signal processing apparatus is produced with an analog-to-digital converter that is connected upstream of the first signal processing device. This achieves the advantage that an analog measurement signal can be processed efficiently.

In a further advantageous embodiment, the signal processing apparatus is produced with a measurement sensor, particularly an angle sensor, that is connected upstream of the first signal processing device and is designed to provide the measurement signal. This achieves the advantage that the measurement signal can be provided for the first signal processing device efficiently.

According to a further aspect of the invention, the object is achieved by an electronic controller for controlling a function of a motor vehicle on the basis of a measured variable and a rate of change of the measured variable, having: a communication interface, particularly a PSI5 or SENT communication interface, for receiving a compiled transmission signal, particularly from the signal processing apparatus; wherein the compiled transmission signal comprises the measured variable and the rate of change of the measured variable; and wherein the communication interface is designed to extract the measured variable and the rate of change of the measured variable from the compiled signal and to output them separately. This achieves the advantage that the transmission signal can be processed efficiently. The electronic controller may be or comprise an engine control unit. Further, the function of the motor vehicle may be an engine function.

BRIEF DESCRIPTION OF THE DRAWINGS

Exemplary embodiments of the invention are depicted in the drawings and are described in more detail below.

In the drawings.

DETAILED DESCRIPTION OF THE PREFERRED EMBODIMENTS

Figure 1:
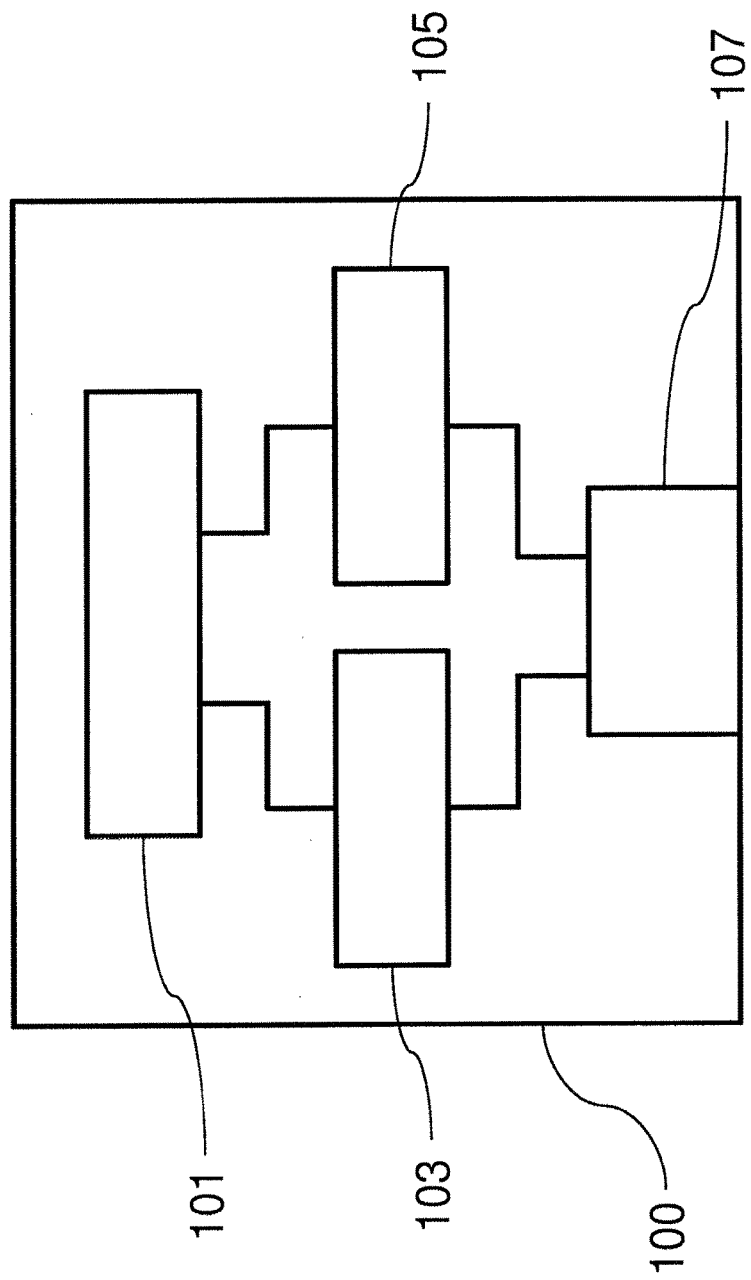
FIG. 1 shows a schematic depiction of a signal processing apparatus.

FIG. 1 shows a schematic depiction of a signal processing apparatus 100. The signal processing apparatus 100 comprises a first signal processing device 101, a second signal processing device 103, a third signal processing device 105 and a communication interface 107.

The signal processing apparatus 100 for processing a measurement signal in a motor vehicle, wherein the measurement signal relates to a time-variant measured variable having successive measured values, may be produced with: the first signal processing device 101 for computing the time-variant measured variable from the measurement signal; the second signal processing device 103 for processing the time-variant measured variable in order to obtain a processed measured variable; the third signal processing device 105 for computing a rate of change of the time-variant measured variable, wherein the third signal processing device 105 is designed to output a supplementary measurement signal that indicates the rate of change; and the communication interface 107, which is designed to combine the processed measured variable and the supplementary measurement signal to form a compiled transmission signal and to transmit the compiled transmission signal.

The motor vehicle may be a motor car, a truck, an automobile or a motor cycle. Further, the motor vehicle can have a measurement sensor that is used to provide the measurement signal. By way of example, the motor vehicle is produced with active suspension control, level control and/or automatic headlamp range adjustment, and the measurement sensor is a chassis position sensor, such as a height position sensor. In this context, a housing of the chassis position sensor may be connected to a chassis of the motor vehicle. Further, a wheel suspension or a wheel of the motor vehicle may be connected via a rod assembly to a lever of the chassis position sensor. This allows the chassis position sensor to be used to detect a movement and/or an angle of the wheel of the motor vehicle relative to the chassis of the motor vehicle. By way of example, the time-variant measured variable is the angle of the wheel of the motor vehicle relative to the chassis of the motor vehicle, and the measurement signal is an angle signal. The measurement signal may further be an analog signal or a digital signal.

The first signal processing device 101 can comprise a processor for performing a coordinate rotation digital computer (CORDIC) algorithm, such as a CORDIC block, or may be formed by a processor for performing a coordinate rotation digital computer (CORDIC) algorithm, such as a CORDIC block.

The second signal processing device 103 can comprise a post-processing device. Further, the second signal processing device 103 may be designed to filter the measurement signal, for example by means of a lowpass filter or a bandpass filter.

The third signal processing device 105 can comprise a processor for computing the rate of change. By way of example, the time-variant measured variable is the angle of the wheel of the motor vehicle relative to the chassis of the motor vehicle, and the measurement signal is the angle signal. In this context, the rate of change may be a speed, particularly an angular speed or a wheel assembly speed, and/or an acceleration, particularly a wheel assembly acceleration, of the wheel of the motor vehicle. Further, the third signal processing device 105 may be designed to perform a computation of the speed by computing a 1st derivation of the computed time-variant measured variable and/or a computation of the acceleration by computing a 2nd derivation of the computed time-variant measured variable in accordance with the formulae $$V=\Delta a/\Delta t; \text{ and}$$

$$a=\Delta v/\Delta t;$$

where $\Delta a$ denotes a difference between two computed measured variables, $\Delta t$ denotes a time difference, v denotes the speed, a denotes the acceleration and $\Delta v$ denotes a difference between two computed speeds. By way of example, the time difference $\Delta t$ corresponds to a period of time between two samples, which is known in the case of synchronous sampling. Further, the third signal processing device 105 may be designed to compute a function derived from the computed time-variant measured variable.

The communication interface 107 can comprise a wired communication interface and/or a wireless communication interface for communication via a communication network. By way of example, the communication interface 107 comprises a serial interface, an interface based on the Peripheral Sensor Interface 5 (PSI5) standard, an interface based on the Single Edge Nibble Transmission (SENT) standard, an interface based on the Power Management Bus (PMBus) standard, an interface based on the Universal Serial Bus (USB) standard, an interface for wireless communication by means of radio frequency identification (RFID), for example based on the ISO/IEC 14443 or ISO/IEC 18000-3 standard, an interface for wireless communication by means of Near Field Communication (NFC), for example based on the ISO/IEC 14443 or ISO/IEC 18092 standard, or an interface for wireless communication based on one of the Bluetooth, ZigBee or Wireless Local Area Network (W-LAN) standards. Further, the communication interface 107 may be a digital interface. The communication network may be a telephone network, a mobile radio network, a computer network, for example a local area network (LAN) or a wireless local area network (W-LAN), or the Internet.

Further, the communication interface 107 may be designed for transmitting the compiled transmission signal to an electronic controller, such as an electronic control unit (ECU), of the motor vehicle, in which the received compiled transmission signal, which can comprise an angle signal, can be processed further. By way of example, the electronic controller is an engine control unit.

According to one embodiment, the signal processing apparatus 100 may be integrated in a sensor, particularly in a measurement sensor.

Figure 2:
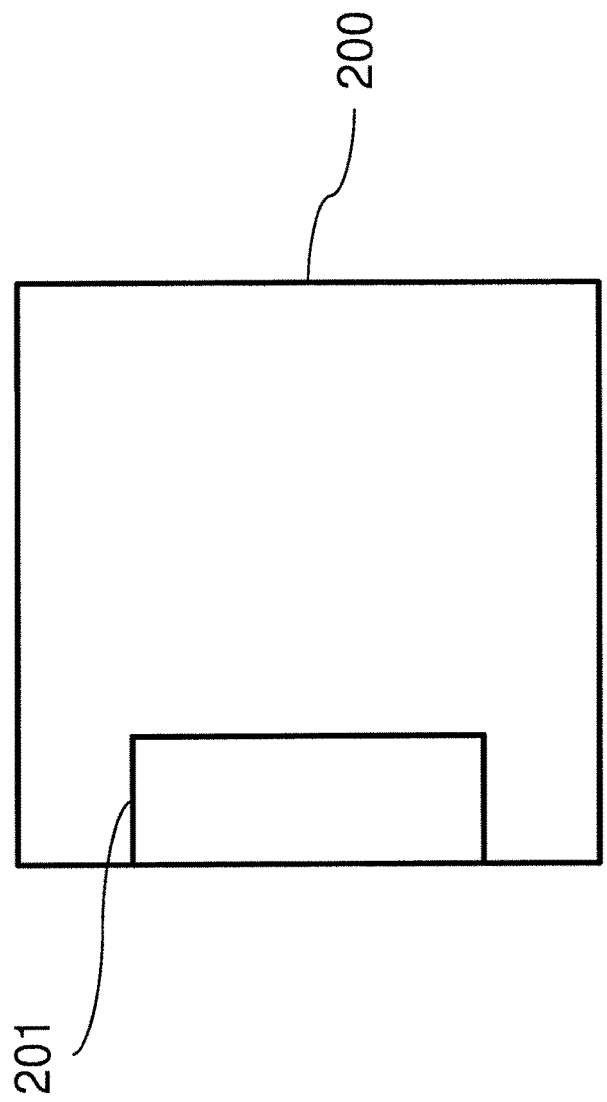
FIG. 2 shows a schematic depiction of an electronic controller.

FIG. 2 shows a schematic depiction of an electronic controller 200. The electronic controller 200 comprises a communication interface 201.

The electronic controller 200 for controlling a function of a motor vehicle on the basis of a measured variable and a rate of change of the measured variable may be produced with: the communication interface 201, particularly a PSI5 or SENT communication interface, for receiving a compiled transmission signal, particularly from the signal processing apparatus 100; wherein the compiled transmission signal comprises the measured variable and the rate of change of the measured variable; and wherein the communication interface 201 is designed to extract the measured variable and the rate of change of the measured variable from the compiled signal and to output them separately. The electronic controller 200 may be or comprise an engine control unit. Further, the function of the motor vehicle may be an engine function.

Figure 3:
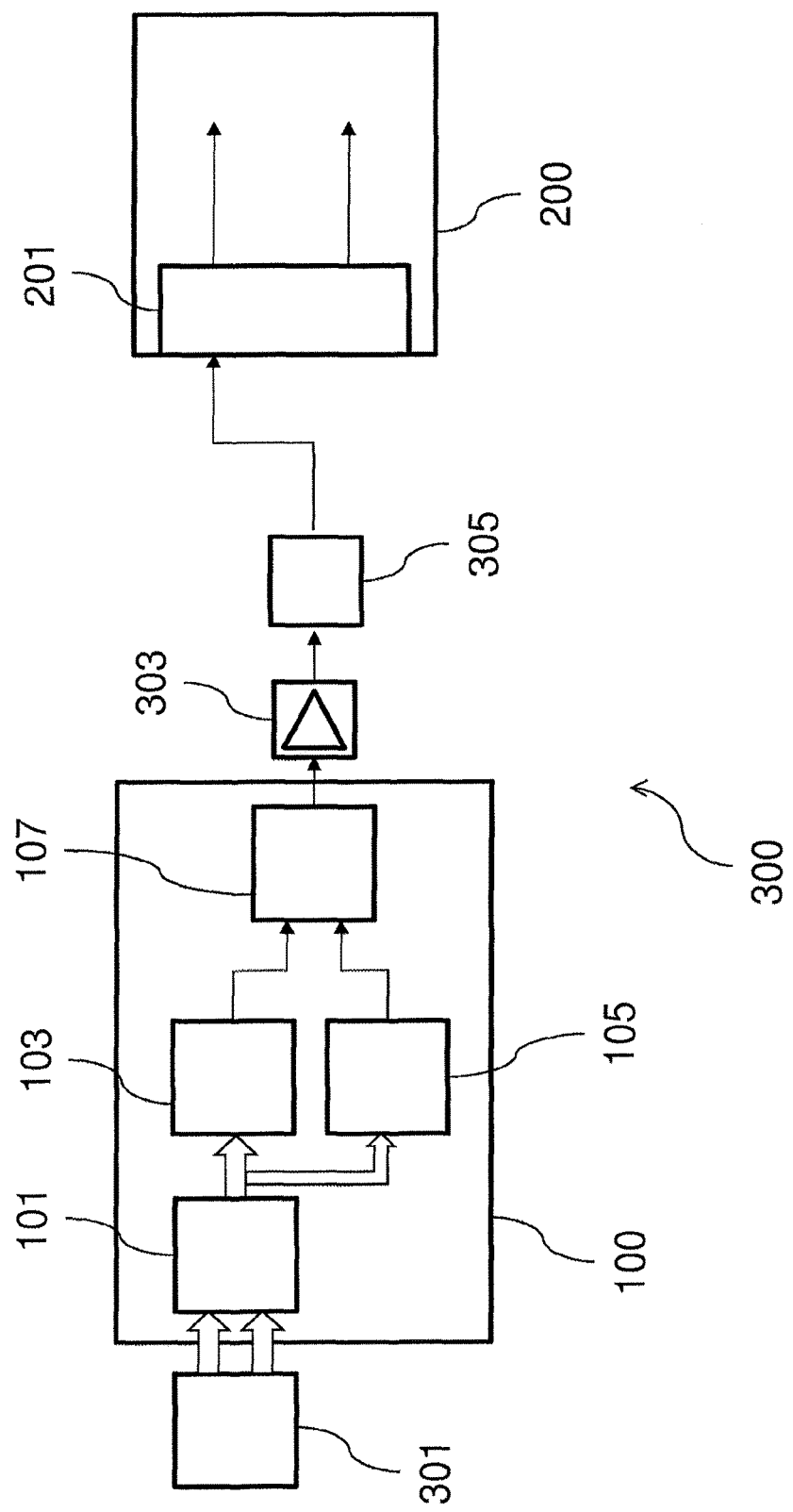
FIG. 3 shows an arrangement for signal processing.

FIG. 3 shows an arrangement 300 for signal processing. The arrangement 300 comprises a measurement sensor 301, the signal processing device 100, a driver 303 for producing a sensor output 305 and the electronic controller 200.

The measurement sensor 301 can comprise a transducer, an analog frontend and/or an analog-to-digital converter. Further, the measurement sensor 301 may be designed to transmit the measurement signal, wherein the time-variant measured variable comprises successive angle measured values as measurement values, and wherein the measurement signal comprises sine values and cosine values as a function of the angle measured values.

The first signal processing device 101 may be designed to receive the measurement signal received from the measurement sensor 301 and to use a CORDIC algorithm to compute a piece of angle information, for example a 14-bit piece of angle information $a_{14}$. Further, the first signal processing device 101 may be designed to transmit the computed piece of angle information to the second signal processing device 103 and the third signal processing device 105.

The second signal processing device 103 may be designed to process the piece of angle information, particularly by means of a post-processing method or by means of clamping, to produce a further piece of angle information, for example a 12-bit piece of angle information $a_{12}(t_0)$, where $t_0$ denotes an instant, and to transmit the further piece of angle information to the communication interface 107.

The third signal processing device 105 may be designed to take the piece of angle information, particularly using a function $f(a, t)$, as a basis for determining a piece of change information, for example a 12-bit piece of change information $f(a_{14}, t_0)$, where t denotes a time and $t_0$ denotes an instant. Further, the third signal processing device 105 may be designed to transmit the piece of change information to the communication interface 107.

The communication interface 107 may be designed to combine the further piece of angle information and the piece of change information and to transmit them to the driver 303.

The driver 303 can comprise a driver circuit having an amplifier. Further, the driver 303 may be a driver in a literal sense. The driver 303 may further be designed to produce the sensor output 305, which comprises the pieces of information $a_{12}(t_0)$ and $f(a_{14},t_0)$, and to transmit it to the communication interface 201 of the electronic controller 200.

The communication interface 201 may be designed to extract the pieces of information $a_{12}(t_0)$ and $f(a_{14},t_0)$ from the sensor output 305 and to output them separately.

According to one embodiment, the measurement sensor 301 can comprise an angle sensor or may be an angle sensor. The angle can in this case be captured in the measurement sensor 301 using a measurement pickup and supplied to the signal processing apparatus 100, such as an internal signal processing system. According to one advantageous embodiment, the measurement sensor 301 and the signal processing device 100 may be arranged adjacently or comprised or integrated in an application specific integrated circuit (ASIC). The processing of the measurement signal in the signal processing apparatus 100 allows the measurement signal to be processed as a high-resolution 14-bit measurement signal for example. This allows processing of the measurement signal to be performed in noise-free fashion, high resolution and quickly.

According to a further embodiment, the measurement signal can further be passed to the outside, or transmitted to a receiver, from the measurement sensor 301 by means of a digital-to-analog converter, for example a 12-bit digital-to-analog converter.

According to a further embodiment, the measurement sensor 301 may be designed to perform an angle computation on the basis of a sin/cos method. In this context, an analog measurement signal from the measurement sensor 301 can be sampled at high resolution, particularly using 14 bits, and provided as a digital value.

According to a further embodiment, filtering of the measurement signal for the purpose of secure transmission of the measurement signal to the outside can produce delays and restrictions in the frequency range.

According to a further embodiment, the electronic controller 200 can be provided with different measurement signals at the same time by means of the compiled signal.

According to a further embodiment, the different measurement signals, can, at least in part, be computed from the measurement signal by a further electronic controller, such as an external electronic controller.

LIST OF REFERENCE SYMBOLS

100 Signal processing apparatus
101 First signal processing device
103 Second signal processing device
105 Third signal processing device
107 Communication interface
200 Electronic controller
201 Communication interface
300 Arrangement
301 Measurement sensor
303 Driver
305 Sensor output

The invention claimed is:

1. A signal processing apparatus for processing a measurement signal in a motor vehicle, wherein the measurement signal relates an N-bit time-variant measured variable having successive measured values, comprising:
    a processor configured to:
        compute the N-bit time-variant measured variable from the measurement signal generated by a motor vehicle sensor;

filter the N-bit time-variant measured variable in order to obtain an M-bit measured variable, where M<N;

compute a rate of change of the N-bit time-variant measured variable, and output an M-bit supplementary measurement signal that indicates the rate of change; and a communication interface configured to:

combine the M-bit measured variable and the M-bit supplementary measurement signal to form a compiled transmission signal, and transmit the compiled transmission signal over a vehicle data bus to a motor vehicle controller that extracts the M-bit measured variable and the M-bit supplementary measurement signal from the compiled transmission signal, and controls a motor of the motor vehicle based on both the extracted M-bit measured variable and the extracted M-bit supplementary measurement signal.

2. The signal processing apparatus as claimed in claim 1, wherein the measured values are chassis position values of a chassis of the motor vehicle or angle measured values, which refer to the chassis position of the chassis of the motor vehicle, or temperature measured values.

3. The signal processing apparatus as claimed in claim 2, wherein the N-bit time-variant measured variable comprises successive angle measured values as measured values, wherein the measurement signal comprise sine values and cosine values as a function of the angle measured values, and wherein the processor is designed to compute the angle measured values from the sine values and the cosine values.

4. The signal processing apparatus as claimed in claim 1, wherein the N-bit time-variant measured variable comprises successive angle measured values as measured values, wherein the measurement signal comprises sine values and cosine values as a function of the angle measured values, and wherein the processor is designed to compute the angle measured values from the sine values and the cosine values.

5. The signal processing apparatus as claimed in claim 1, wherein the processor is designed to implement a Coordinate Rotation Digital Computer (CORDIC) algorithm for computing the N-bit time-variant measured variable from the measurement signal.

6. The signal processing apparatus as claimed in claim 1, wherein the processor has a signal processing delay, and wherein the processor is designed to delay the measurement signal by the signal processing delay in order to obtain the M-bit measured variable.

7. The signal processing apparatus as claimed in claim 1, wherein the processor is designed to reduce a maximum value of the measurement signal or to use clamping to process it or to filter it, by low-pass filtering or bandpass filtering, or to process the measurement signal by mean value formation, by forming an arithmetic mean value from two or more measured values, in order to obtain the M-bit measured variable.

8. The signal processing apparatus as claimed in claim 1, wherein the processor is designed to compute the rate of change of the N-bit time-variant measured variable by a derivation of the variant measured variable with respect to time, by forming a difference between successive measured values, in order to obtain a speed value as the M-bit supplementary measurement signal.

9. The signal processing apparatus as claimed in claim 1, wherein the processor is designed to compute the rate of change of the N-bit time-variant measured variable by means of a second derivation of the variant measured variable with respect to time, in order to obtain an acceleration value as the M-bit supplementary measurement signal.

10. The signal processing apparatus as claimed in claim 1, wherein the measurement signal comes from a measurement sensor, and wherein the communication interface is further designed to combine the M-bit measured variable, the M-bit supplementary measurement signal and measurement sensor parameters to form the compiled transmission signal and to transmit the compiled transmission signal.

11. The signal processing apparatus as claimed in claim 1, wherein the communication interface is a peripheral sensor interface (PSI5) or a single edge nibble transmission (SENT) communication interface or forms a digital interface based on the PSI5 or SENT standard.

12. The signal processing apparatus as claimed in claim 1, wherein the communication interface is designed to combine the M-bit measured variable and the M-bit supplementary measurement signal to form a compiled transmission signal on the basis of a peripheral sensor interface (PSI5) or a single edge nibble transmission (SENT) protocol in order to obtain the compiled transmission signal.

13. The signal processing apparatus as claimed in claim 1, wherein the compiled transmission signal is a digital signal, and wherein the communication interface is designed to subject the compiled transmission signal to digital-to-analog conversion.

14. The signal processing apparatus as claimed in claim 1, wherein the communication interface is designed to transmit the compiled transmission signal by time division multiple access (TDMA).

15. The signal processing apparatus as claimed in claim 1, further comprising a measurement sensor that is connected upstream of the processor and is designed to provide the measurement signal.

16. The signal processing apparatus as claimed in claim 15, wherein the measurement sensor is an angle sensor.

17. An electronic controller for controlling a function of a motor vehicle on the basis of a measured variable and a rate of change of the measured variable, comprising:

a communication interface for receiving a compiled transmission signal, from the signal processing apparatus as claimed in claim 1;

wherein the compiled transmission signal comprises the measured variable and the rate of change of the measured variable; and wherein the communication interface is designed to extract the measured variable and the rate of change of the measured variable from the compiled signal and to output them separately.

18. The electronic controller as claimed in claim 17 wherein the communication interface is a peripheral sensor interface (PSI5) or a single edge nibble transmission (SENT) communication interface.

19. The signal processing apparatus as claimed in claim 1, wherein the measurement signal comes from a measurement sensor, and wherein the communication interface is further designed to combine the M-bit measured variable, the M-bit supplementary measurement signal and measurement sensor parameters, including temperature values, offset values or gain values, to form the compiled transmission signal and to transmit the compiled transmission signal.

* * * * *